United States Patent [19]
Walters

[11] 4,150,581
[45] Apr. 24, 1979

[54] BELT FOR TRANSPORT OF MATERIALS AND TRANSMISSION OF POWER

[76] Inventor: Howard G. Walters, Higby Rd., Middletown, Conn. 06457

[21] Appl. No.: 391,856

[22] Filed: Aug. 27, 1973

[51] Int. Cl.² .............................................. B29H 7/22
[52] U.S. Cl. ...................................... 74/238; 138/123; 138/126; 156/122; 156/137; 428/36; 428/192; 428/193; 428/253; 428/254
[58] Field of Search ............... 156/184, 190, 192, 218, 156/121, 122, 137; 161/89, 146, 125, 86, 149; 117/139.5 CQ, 162, 163; 74/238; 138/123–126; 428/36, 192, 193, 194, 253, 254

[56] References Cited

U.S. PATENT DOCUMENTS

| | | | |
|---|---|---|---|
| 792,901 | 6/1905 | Jewett | 138/123 |
| 1,162,745 | 12/1915 | Blodgett | 156/121 |
| 1,372,428 | 3/1921 | Hardy | 74/238 |
| 1,375,046 | 4/1921 | Hardy | 74/238 |
| 1,972,756 | 9/1934 | Blaisdell | 138/125 |
| 2,269,877 | 1/1942 | Johnson | 138/123 |
| 2,414,424 | 1/1947 | Stevens | 161/89 |
| 2,674,644 | 4/1954 | Goodloe | 161/89 |
| 2,995,781 | 8/1961 | Sipler | 161/DIG. 4 |
| 3,050,106 | 8/1962 | Pusch et al. | 156/218 |
| 3,424,204 | 1/1969 | Sato | 138/124 |
| 3,501,359 | 3/1970 | Gillespie et al. | 156/184 |
| 3,578,028 | 5/1971 | Roberts | 138/123 |
| 3,658,614 | 4/1972 | Beck | 156/192 |
| 3,695,961 | 10/1972 | Pfeiffer et al. | 156/122 |

Primary Examiner—James J. Bell

[57] ABSTRACT

A single or multiply endless belt possessing predetermined elastic properties consisting of a flat knit substrate which has been impregnated with an elastomeric material and made endless by wrapping upon itself and the method of producing the same.

10 Claims, 10 Drawing Figures

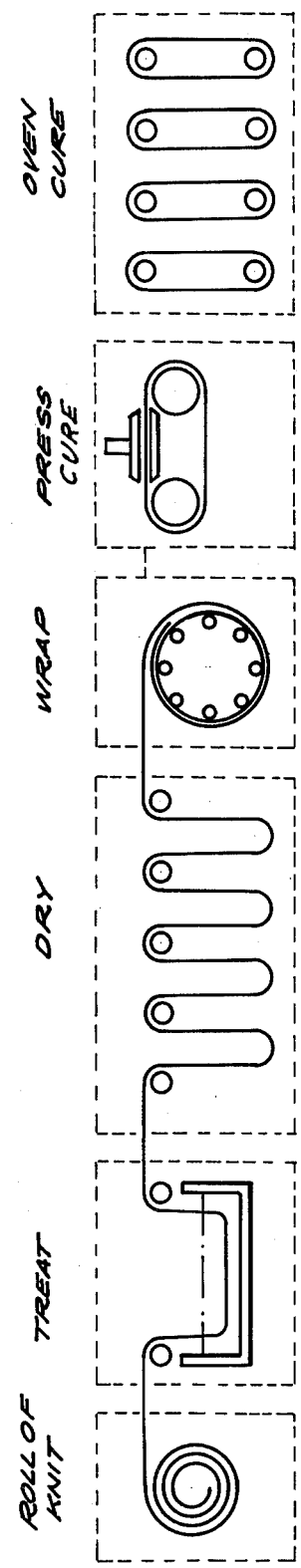
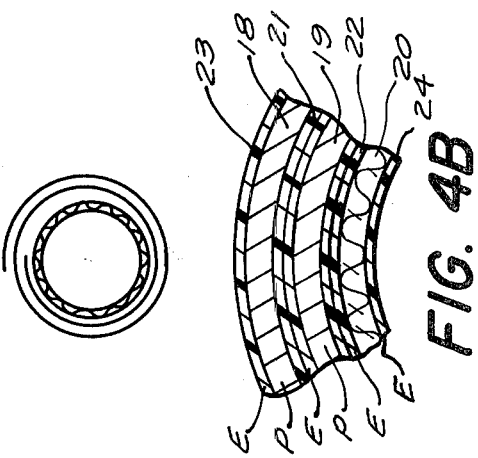
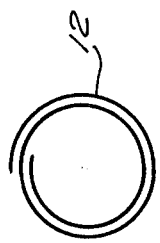
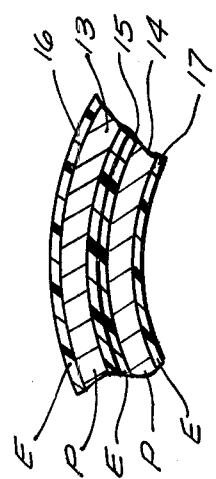
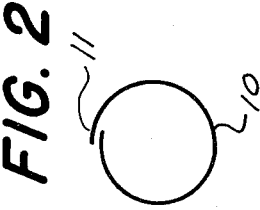

BELT FOR TRANSPORT OF MATERIALS AND TRANSMISSION OF POWER

BACKGROUND OF THE INVENTION

Many applications of belts for transporting materials and transmitting power require a belt that will remain precisely positioned and permanently tensioned when operating on pulleys or rollers that are located on fixed centers. When two or more belts must operate on pulleys or rollers arranged on shafts having fixed centers the positioning and tensioning of the belt for satisfactory operation is very important. The use of fixed centers to conserve space and reduce cost by eliminating take-up mechanisms is very common in machine design today, particularly in the business machines field.

Endless belts in a variety of forms have been produced to serve this purpose.

One design utilized plied stitched belts in which two or more plies of woven fabric were stitched together. Such belts tended to delaminate and did not possess the elasticity nor the elastic recovery necessary to maintain permanent tension on the fixed center drive.

Another design used gimped yarns (yarns with a rubber core) in a woven fabric. This product generally afforded high, but uncontrollable elasticity so that tension on the drive varied tremendously and was ineffective.

Another design used unsupported elastomeric film, but this belt, because of the lack of any fabric reenforcement to contain its elastic properties, exhibited excessive creep, high abrasive wear and consequently poor operating characteristics.

A popular design today embodies a woven tubular fabric where a degree of elasticity has been imparted through the weave pattern. This has been a successful design but weaving limits the elasticity and it is not possible to impart sufficient elasticity to meet the requirements of many of the modern machines.

Furthermore a tubular knit substrate has been used to obtain elastic properties, but the art of knitting tubular fabrics does not produce a material that possesses adequately controlled elasticity and the degree of elasticity is limited by the size of each particular tubing.

SUMMARY OF THE INVENTION

A belt with predetermined elasticity capable of stretching usefully in the order of up to 10% and having the ability to recover substantially completely. Such a desirable belt can be produced by utilizing a flat knit substrate of known elasticity saturated with an elastomeric material and wrapped upon itself to be made endless. It can be wrapped upon itself a number of times to provide a multiply structure or wrapped upon or within a tubular base which can be woven or otherwise suitably constructed. Unlike other prior designs which lost most of their elasticity if made multiply, the improved design of this invention retains its elasticity in multiply construction. Additionally, when combined with base fabrics or tubes of other constructions the present design will conform to the base and not appreciably alter the elastic (or nonelastic) properties of the base.

In the practice of my invention as disclosed herein I first provide a fabric substrate of knit construction and predetermined elasticity and saturate it with an elastomeric material of desired properties. The saturated substrate is wrapped upon itself or a base of other construction in one or more plies and then partially cured under heat and pressure at a designated length. Thereafter the structure is cured completely in a heated oven at a designated length and after removing from the heat is held at the designated length until thoroughly cool. The widest practical tube is produced and belts of any desired width slit therefrom.

The invention therefore consists of a flat knit base impregnated and wrapped to develop the desired number of plies in an endless belt.

It is also within the scope of this invention to consider wrapping an endless base tube with an impregnated flat knit substrate. This can enhance the mechanical properties and increase the utility of the base tube. For example, in friction drives where critical clearances are involved and where increased lateral rigidity is necessary thickness can be achieved without substantially interfering with the characteristics of the base tube itself.

DESCRIPTION OF THE DRAWINGS

FIG. 1 is a diagrammatic illustration of the steps utilized in the production of belting in accordance with this invention;

FIG. 2 is a diagrammatic illustration from the side of a single ply belt constructed in accordance with this invention;

FIG. 3A is a diagrammatic illustration from the side of a multiply belt constructed in accordance with this invention;

FIG. 3B is an enlarged segmentary detail view of the belt shown in FIG. 3A showing the layers of substrate and elastomer in the multiply structure;

FIG. 4A is a view similar to FIG. 3A of a multiply belt constructed in accordance with this invention with an endless woven base;

FIG. 4B is a view similar to FIG. 3B of the belt illustrated in FIG. 4A;

DESCRIPTION OF THE PREFERRED EMBODIMENT

Figure 5:
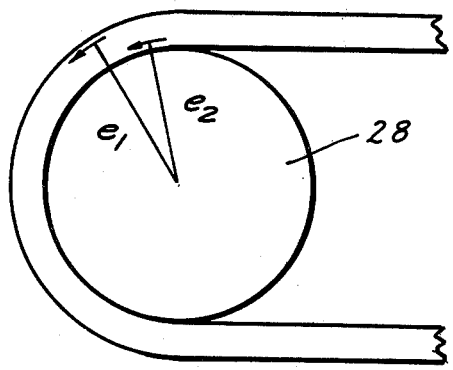
FIG. 5 is a diagrammatic view of a belt curved as traveling over a roller to illustrate the stress distribution between inner and outer layers.

The steps utilized in producing the belt which is the subject of this invention are illustrated in diagrammatic form in FIG. 1 consisting of providing the flat knit substrate, treating the substrate with an elastomeric material in a dipping process, drying, wrapping to produce the endless form, press curing and final oven curing. The manufactured tube is then slit longitudinally to provide one or more belts of desired width.

Any suitable knit structure can be utilized as a substrate and any suitable thread or yarn can be utilized. However, for example, synthetic yarns such as polyester or nylon, a polyamide fiber are preferred. The fabric is a flat knit rather than tubular which provides many advantages in manufacturing as well as design. Flat fabrics permit greater versatility and yet greater simplicity in equipment than do tubular fabrics. A tubular knit material possesses elasticity specific and limited to its individual size, whereas flat knit fabrics provide practically unlimited elasticity. When a flat knit is used in accordance with this invention it can be processed to produce any desired length to provide any practical amount of elasticity.

The substrate in the preferred form of the invention may or may not be pretreated prior to impregnation with the elastomer. It is possible that in order to achieve desired results or properties a pretreatment as is known in the art can be utilized to improve the adherence of the elastomer to the yarns.

Before treating with the elastomer the strength and elasticity of the flat knit fabric should be selected within a predetermined range having in mind the end result desired.

The fabric is saturated with elastomer while in the flat condition. It is taken off the roll and run through a vat in a dip process substantially as shown in FIG. 1.

Any suitable elastomer may be used, such as neoprene, an oil resistant synthetic rubber made by the polymerization of chloroprene.

In the treating step in the preferred embodiment a curable neoprene compound is dissolved to form a solvent cement with a solids concentration of approximately fifteen to twenty percent. Several coats are applied by dipping. The finished product contains in the order of seventy to eighty percent neoprene compound; anything greater than forty percent has been found to be adequate to produce a useful finished product. After treating, the product is dried at room temperature to allow the solvents to evaporate, the solids remaining. If desired the product could be more rapidly dried at an elevated temperature.

The product is then wrapped upon a suitable form, usually at a zero percent to ten percent reduction from the desired length of the finished belt. In certain applications the wrapping might be oversized. Wrapping undersize reduces in proportion the elasticity of the finished belt. The less undersize the wrap the greater the elasticity of the finished belt.

The natural "tack" of the neoprene compound allows practical assembly on the form to the desired number of plies; even a single ply can be successfully assembled accordingly. The distortion at the necessary overlap is minimized in view of the excellent mobility of the knit.

One of the distinct advantages of the subject invention is that increased thickness can be obtained by multiple plying while retaining to a great degree the desirable elastic characteristics of the single flat knit fabric. Crowding or densifying is reduced and the elastomer between the fabric layers isolates the knit so that each layer retains, to a substantial degree, the characteristics of the thin knit fabric and a long flex life is consequently obtained.

The next step is the press cure, that is, curing under heat and pressure. This is done by placing the endless tube on rolls at approximately the length at which the belt is to be ultimately used. Platen covers can be used during the press cure to provide particular surface designs if desired. The press cure imparts the approximate desired length and the finished pattern at a safe pressure and temperature and the time cycle is minimum but adequate to secure clean release from the platen surfaces. The full state of cure is not reached in the press cure and final curing takes place in an oven where the tube is held on a frame at the desired finished belt length. The tube is then cooled to room temperature before removing from the frame.

The finished endless belt is then slit at its specified width from the tube.

In FIG. 2 a single ply belt constructed in accordance with this invention is illustrated and indicated by the numeral 10. The slight overlap or join is indicated by the numeral 11. In FIG. 3A a multiply belt is shown and indicated by the numeral 12. In FIG. 3B it is seen that this is a two-ply belt with the plys respectively indicated by the numerals 13 and 14. Since the fabric was impregnated while in flat condition, a layer of elastomer is developed on both surfaces. Thus a layer of elastomer 15 appears between plys 13 and 14 isolating them from each other and layers of elastomer 16 and 17 appear on the outer and inner surfaces of the belt itself.

FIGS. 4A and 4B illustrate a variation of the invention in which a multiply belt is constructed by wrapping the flat knit impregnated fabric over an endless woven base tube. Thus in FIG. 4B plys 18 and 19 after wrapping over woven tubular base 20 are themselves separated by a layer of elastomer 21 and separated from the woven base 20 by a layer of elastomer 22 with a layer of elastomer 23 appearing on the outer or upper surface of the belt and a layer of elastomer 24 on the inner surface of the belt. The presence of the impregnated knit fabric provides thickness substantially without interfering with the characteristics of the tubular base.

The importance of a thin fabric is seen in FIG. 5 where a belt is illustrated traveling over roller 28. Stress $e_1$ at the outer surface is greater than stress $e_2$ at the inner surface in direct proportion to the thickness of the belt. Hence in the subject invention wherein a thin knit fabric is wrapped in order to develop a multiply structure, each of the plys is isolated by the layer of elastomer so that the stress in the overall belt is reduced. The reduction in stress is brought about by using a (thin) knit fabric which possesses only slight difference in stress between its inner and outer surfaces and by isolating each ply which in turn results in minimum difference in stress between the inside and outside ply of the total belt.

Figure 6:
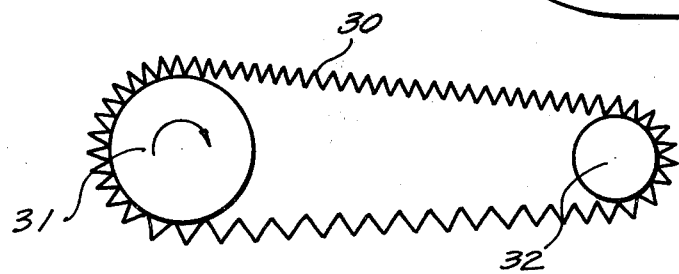
FIGS. 6 and 7 are diagrammatic views of belts to illustrate the distribution of tension and creep in operation.
Figure 7:
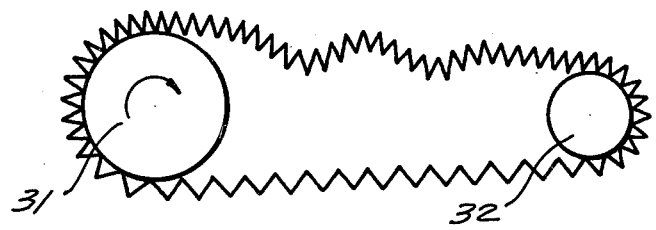

In FIG. 6 belt 30 is shown supported by pulleys 31 and 32 with pulley 31 being the drive pulley. It is noted that the upper portion of the belt between pulleys 31 and 32 is in compression while the lower portion is in tension. Additionally, in FIG. 7 the same belt is shown running under a greater load so that the portion of the belt in compression is actually loose and fluttering. FIGS. 6 and 7 represent undesirable situations that cause creep to varying degrees. No elastic belt can be designed so that creep will be completely eliminated.

Creep is the result of buildup of tension on the tight side such as the lower side in FIGS. 6 and 7 with the creation of a slack side such as the upper side in FIGS. 6 and 7. When the tension has built up sufficiently to overcome the frictional engagement of the driven pulley and the belt, the belt slips on the pulley to adjust and take up a portion of the slack in the slack side. This occurs continually as the belt is driven. Excessive elasticity such as in a rubber band results in excessive creep. In the subject invention a resistance to elongation is provided while sufficient elasticity for adjustment is present. Thus creep is reduced to acceptable levels.

Figure 8:
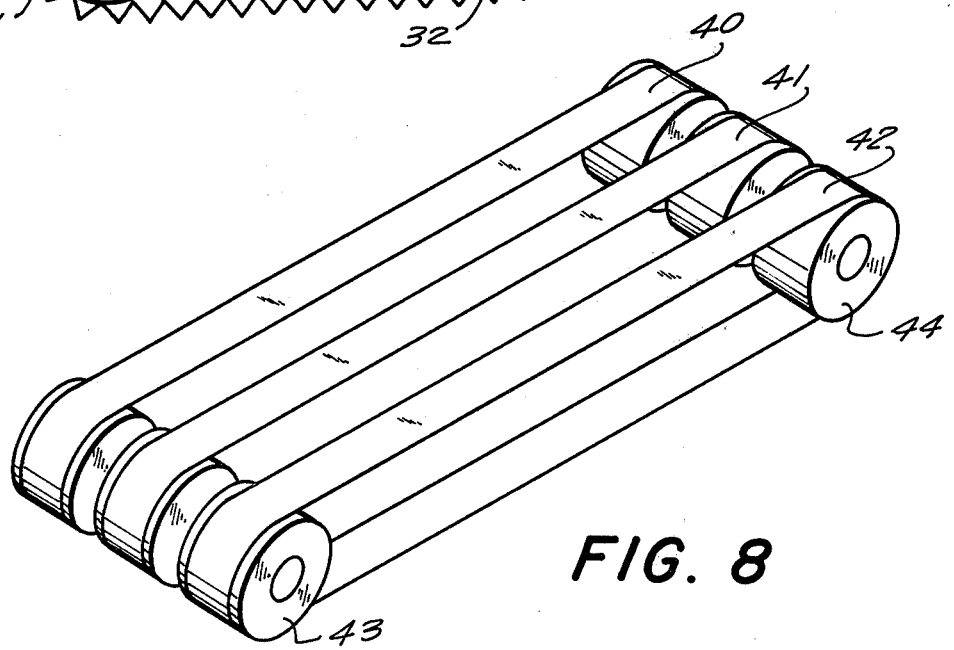
FIG. 8 is a perspective view of a plurality of belts illustrated on a multiple drive.

FIG. 8 illustrates an application in which belts 40, 41 and 42 are supported on a multiple drive system consisting of rollers 43 and 44. In such a system in the absence of controlled elasticity alignment and tension control of belts is a considerable problem.

EXAMPLE I

A single ply belt as illustrated in FIG. 2 was constructed in accordance with the present method as follows:

The base fabric was constructed of continuous filament polyester yarn of very low twist in a plain rib knit having 26 wales and 38 courses. The fabric had an average tensile strength (Grab Method) of 106 lbs. in the wales direction and 75 lbs. in the courses direction with a fabric weight of 5.80 oz. per square yard.

The base fabric was impregnated with a curable neoprene compound reinforced with carbon black by applying several dip coats to provide a dry pickup of 285% to 335%. In other words, the impregnant content was 2.85 to 3.35 times the weight of the (untreated) fabric.

The impregnated fabric was dried and then wrapped singly at 5% under desired finished length at 17 1/16" with a 1/16" overlap; the desired finished length of the belt is 17 31/32". The wrapped tube was then press cured for three minutes at approximately 355° F. at a pressure of approximately 90 pounds per square inch. After completing the cure in the oven the belt exhibited a tensile strength of 123 pounds to 127 pounds per 1 inch of width in endless form.

EXAMPLE II

A two ply belt as illustrated in FIGS. 3A and 3B was constructed in accordance with the present method as follows:

The base fabric which was the same as in Example I was prepared in the same manner as in Example I. It was then wrapped at 7% under desired finished length in a two ply structure at 10 7/16" with a 1/16" overlap; the desired finished length of the belt is 11.200". The wrapped tube was then press cured for three minutes at approximately 355° F. at a pressure of approximately 90 pounds per square inch. After completing the cure in the oven the belt exhibited a tensile strength of 250 lbs. to 264 lbs. per inch of width in endless form.

EXAMPLE III

A belt having two plys of knit wrapped on a woven base as illustrated in FIGS. 4A and 4B was constructed in accordance ith the present method as follows:

The knit base fabric which was the same as in Example I was prepared in the same manner as in Example I. It was then wrapped around an endless woven base fabric which had been impregnated to provide a dry pick-up of approximately 165%. The woven base is a plain weave blend of cotton and synthetic yarns such as nylon or polyester designed to exhibit elastic properties.

The knit fabric is wrapped around the woven base tube two times to create a three ply structure overall. The woven base tube is 11⅛" in circumference or 8% under the desired finished belt length of 12⅛". The belt is then press cured for three minutes at approximately 355° F. at a pressure of approximately 90 pounds per square inch. After completing the cure in the oven the belt exhibited a tensile strength of 420 lbs. to 436 lbs. per inch of width in endless form.

Although in this Example the knit fabric is wrapped around the outside of the woven base, it is also within the contemplation of this invention to have the woven base as the outside ply of the finished belt. Also the non-knit base or substrate could be in a form other than woven.

In the Examples the belt has been wrapped undersize or at a length less than that ultimately desired. The belt, however, under certain circumstances such as in the expectation of shrinkage or in order to build in greater elasticity can be wrapped oversize.

I claim:

1. A belt for transport of materials and transmission of power comprising a flat knit fabric, a cured elastomeric impregnant in said fabric and on the surface thereof, an end of said fabric joined to the remainder of said fabric to form a tube with said impregnant providing the means for joining said end to said fabric and said belt having the capability of stretching up to 10% of its unstretched length with substantially complete recovery.

2. An endless belt in accordance with claim 1 in which the weight of the finished product is at least forty percent elastomeric impregnant.

3. A belt for transport of materials and transmission of power comprising a flat knit fabric, a cured elastomeric impregnant in said fabric and on the surfaces thereof, the ends of said fabric joined together by said impregnant to form a tube and said belt having the capability of stretching up to 10% of its unstretched length with substantially complete recovery.

4. An endless belt according to claim 3 in which the weight of the finished product is at least 40% elastomeric impregnant.

5. A belt for transport of materials and transmission of power comprising a flat knit fabric, a cured elastomeric impregnant in said fabric and on the surfaces thereof and said fabric wrapped upon itself to form a tube with facing surfaces joined by said impregnant, and said belt having the capability of stretching up to 10% of its unstretched length with substantially complete recovery.

6. An endless belt according to claim 5 in which the weight of the finished product is at least 40% elastomeric impregnant.

7. A belt for transport of materials and transmission of power comprising a tubular support member, a knit fabric wound around said tube, a cured elostomeric impregnant in said tube and said knit fabric and on the surfaces thereof and facing surfaces of said knit fabric and said tube joined by said impregnant and said belt having the capability of stretching within the range of 0 to 10% of its unstretched length with substantially complete recovery.

8. An endless belt according to claim 7 in which the weight of the finished product is at least 40% elastomeric impregnant.

9. A belt for transport of materials and transmission of power comprising a tubular support member, a knit fabric in the form of a second tube within said first tube, a cured elastomeric impregnant in said support member and said knit fabric and on the surfaces thereof and facing surfaces of said knit fabric and said support member joined by said impregnant and said belt having the capability of stretching within the range of 0 to 10% of its unstretched length with substantially complete recovery.

10. An endless belt according to claim 9 in which the weight of the finished product is at least 40% elastomeric impregnant.

* * * * *